United States Patent
Johncock et al.

(10) Patent No.: US 10,085,584 B2
(45) Date of Patent: Oct. 2, 2018

(54) METHOD OF REGULATING TEMPERATURE FOR SOUS VIDE COOKING AND APPARATUS THEREFOR

(71) Applicant: Whirlpool Corporation, Benton Harbor, MI (US)

(72) Inventors: James Charles Johncock, Shelbyville, MI (US); Darpan Dinkar Patil, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 220 days.

(21) Appl. No.: 14/298,991

(22) Filed: Jun. 9, 2014

(65) Prior Publication Data
US 2015/0351579 A1    Dec. 10, 2015

(51) Int. Cl.
  *A47J 27/62*   (2006.01)
  *A47J 27/10*   (2006.01)

(52) U.S. Cl.
  CPC ............... *A47J 27/10* (2013.01); *A47J 27/62* (2013.01)

(58) Field of Classification Search
  CPC ........ A47J 27/62; A47J 36/32; A47J 36/2483; A47J 36/16; A47J 36/30; A47J 36/28; A47J 27/10; A23L 1/0128; A23L 1/0135; A23L 1/0121; A23V 2002/00; A23V 2300/24
  USPC .......... 99/330, 331, 342, 343, 344, 403, 483
  See application file for complete search history.

(56) References Cited

U.S. PATENT DOCUMENTS

| | | | | |
|---|---|---|---|---|
| 2,174,028 A | * | 9/1939 | Blakesley | A47J 27/62 126/374.1 |
| 2,392,635 A | * | 1/1946 | Bletz | A47J 27/62 126/39 H |
| 2,399,423 A | * | 4/1946 | Bletz | F24C 15/105 200/19.01 |
| 2,550,579 A | * | 4/1951 | McDowell | A47J 27/62 200/18 |

(Continued)

FOREIGN PATENT DOCUMENTS

| | | |
|---|---|---|
| WO | 2004008923 A2 | 1/2004 |
| WO | 2012006674 A1 | 1/2012 |

(Continued)

OTHER PUBLICATIONS

European Patent Office, European Search Report and Written Opinion for European Application No. 15167704.4, dated Oct. 6, 2015, 6 pages.

*Primary Examiner* — Eric Stapleton
(74) *Attorney, Agent, or Firm* — Price Heneveld LLP

(57) ABSTRACT

A method of regulating the temperature of a cooking liquid during sous vide cooking in a cooking vessel on a burner of a cooktop includes setting a desired cooking temperature and measuring the temperature of the cooking liquid inside the sous vide cooking vessel at a plurality of predetermined time intervals with a first temperature sensor mounted on an interior surface of a wall of the sous vide cooking vessel. The temperature of the cooking liquid is compared to the desired cooking temperature at each of the predetermined time intervals. The energy output of the burner is controlled based on the difference between the temperature of the cooking liquid and the desired cooking temperature. A cooking vessel and system for sous vide cooking using this method are also disclosed.

10 Claims, 6 Drawing Sheets

(56) References Cited

U.S. PATENT DOCUMENTS

| | | | | |
|---|---|---|---|---|
| 2,657,580 A * | 11/1953 | Schroeder | G01K 7/34 | 374/155 |
| 2,764,661 A * | 9/1956 | Molyneaux | F24C 15/106 | 219/448.14 |
| 2,781,038 A * | 2/1957 | Sherman | F24C 3/126 | 126/39 H |
| 2,806,122 A * | 9/1957 | Thunander | G05D 23/24 | 219/448.14 |
| 2,816,997 A * | 12/1957 | Conrad | G01K 7/22 | 338/23 |
| 2,858,699 A * | 11/1958 | Scofield | G01K 13/10 | 126/39 G |
| 3,062,943 A * | 11/1962 | Euler | G04C 23/18 | 219/486 |
| 3,267,731 A * | 8/1966 | Wharton | G01K 1/14 | 374/154 |
| 3,326,692 A * | 6/1967 | Martino | A47J 37/1266 | 219/491 |
| 3,332,338 A * | 7/1967 | Wein | A47J 27/18 | 126/378.1 |
| 3,511,167 A * | 5/1970 | Holtkamp | A47J 37/041 | 374/153 |
| 3,536,129 A * | 10/1970 | White | A23L 3/365 | 165/61 |
| 3,565,165 A * | 2/1971 | Slavin | G03D 13/006 | 165/206 |
| 3,582,921 A * | 6/1971 | Krieger | G08C 15/04 | 340/517 |
| 3,594,751 A * | 7/1971 | Ogden | G08B 17/06 | 340/509 |
| 3,606,792 A * | 9/1971 | Yoshimoto | G01K 1/08 | 374/155 |
| 3,608,470 A * | 9/1971 | Zabiyakin | A23L 3/00 | 99/330 |
| 3,611,336 A * | 10/1971 | Chen | F24C 3/128 | 126/299 R |
| 3,622,753 A * | 11/1971 | Lax | A47J 36/2483 | 219/268 |
| 3,634,652 A * | 1/1972 | Shimizu | G05D 23/1906 | 219/497 |
| 3,636,309 A * | 1/1972 | Deaton | H05B 3/746 | 219/446.1 |
| 3,640,208 A * | 2/1972 | Size | A47J 37/1242 | 99/403 |
| 3,641,919 A * | 2/1972 | Longinotti | A23L 3/18 | 99/330 |
| 3,645,804 A * | 2/1972 | Ponchel | C22F 1/00 | 148/502 |
| 3,706,094 A * | 12/1972 | Cole | G01S 13/755 | 310/313 D |
| 3,778,798 A * | 12/1973 | Heit | G01K 3/005 | 219/720 |
| 3,786,220 A * | 1/1974 | Harnden, Jr. | F24C 15/105 | 219/445.1 |
| 3,800,091 A * | 3/1974 | Glidden | H04M 11/04 | 340/12.14 |
| 3,814,888 A * | 6/1974 | Bowers | A47J 36/2483 | 219/624 |
| 3,815,113 A * | 6/1974 | Welch | G01K 3/005 | 327/449 |
| 3,828,164 A * | 8/1974 | Fischer | A47J 27/62 | 219/431 |
| 3,866,472 A * | 2/1975 | Witt | G01K 1/14 | 338/28 |
| 3,875,854 A * | 4/1975 | Wassenaar | A47J 27/62 | 219/491 |
| 3,928,045 A * | 12/1975 | Tsunoda | A47J 27/18 | 221/150 HC |
| 3,931,620 A * | 1/1976 | Wellman, Jr. | F24C 7/08 | 327/449 |
| 3,932,675 A * | 1/1976 | Main | G05D 23/1951 | 426/231 |
| 3,932,849 A * | 1/1976 | Welch | G01K 3/005 | 340/586 |
| 3,974,696 A * | 8/1976 | Fitzmayer | A47J 37/00 | 219/712 |
| 3,975,720 A * | 8/1976 | Chen | F24C 7/02 | 219/712 |
| 3,985,120 A * | 10/1976 | Lazaridis | A47J 27/17 | 126/390.1 |
| 3,988,928 A * | 11/1976 | Edstrom | G01P 5/10 | 73/204.19 |
| 3,988,929 A * | 11/1976 | White | G12B 17/02 | 219/712 |
| 3,988,930 A * | 11/1976 | Fitzmayer | G12B 17/02 | 219/712 |
| 3,991,615 A * | 11/1976 | Hornung | G12B 17/02 | 219/712 |
| 4,013,859 A * | 3/1977 | Peters, Jr. | H05B 6/062 | 219/626 |
| 4,038,510 A * | 7/1977 | White | H05B 6/6452 | 174/136 |
| 4,086,813 A * | 5/1978 | Meek | G01K 1/08 | 219/712 |
| 4,088,863 A * | 5/1978 | Jellies | G01K 1/024 | 219/713 |
| 4,131,786 A * | 12/1978 | Cooper | F24C 7/087 | 219/487 |
| 4,146,865 A * | 3/1979 | Scharbach | G01K 7/18 | 338/229 |
| 4,189,504 A * | 2/1980 | Jimenez | A23L 1/1033 | 426/508 |
| 4,191,875 A * | 3/1980 | Cunningham | H05B 6/1263 | 219/494 |
| 4,197,581 A * | 4/1980 | Watrous | G05D 23/24 | 219/494 |
| 4,204,186 A * | 5/1980 | Parisi | G01K 7/22 | 29/612 |
| 4,210,675 A * | 7/1980 | Liebermann | A47J 39/006 | 165/919 |
| 4,217,477 A * | 8/1980 | Matsubara | G01K 7/24 | 219/516 |
| 4,224,862 A * | 9/1980 | Liebermann | A47J 39/006 | 99/331 |
| 4,225,776 A * | 9/1980 | Meisner | G04G 9/0064 | 219/492 |
| 4,230,731 A * | 10/1980 | Tyler | G01K 1/024 | 219/713 |
| 4,237,368 A * | 12/1980 | Welch | G05D 23/24 | 219/448.12 |
| 4,237,731 A * | 12/1980 | Dehn | G01K 7/16 | 219/712 |
| 4,270,598 A * | 6/1981 | Britton | A23L 3/363 | 165/61 |
| 4,309,584 A * | 1/1982 | Terakami | H05B 6/6435 | 219/492 |
| 4,328,408 A * | 5/1982 | Lawson | G05B 19/102 | 219/506 |
| 4,346,836 A * | 8/1982 | Nagel | A47J 27/62 | 126/374.1 |
| 4,362,094 A * | 12/1982 | Polster | G05D 23/1951 | 374/170 |
| 4,367,387 A * | 1/1983 | Tachihara | G04G 15/003 | 219/493 |
| 4,367,388 A * | 1/1983 | Ishihara | F24C 7/06 | 219/685 |
| 4,372,980 A * | 2/1983 | Luebke | A47J 27/0817 | 426/231 |
| 4,377,733 A * | 3/1983 | Yamaguchi | G01K 1/024 | 219/516 |
| 4,399,351 A * | 8/1983 | Koff | A47J 27/004 | 219/430 |
| 4,404,462 A * | 9/1983 | Murray | C02F 1/5209 | 219/497 |
| 4,410,793 A * | 10/1983 | Fischer | F24C 15/102 | 219/448.15 |
| 4,431,907 A * | 2/1984 | Barnett | F24C 7/08 | 219/413 |

(56) References Cited

U.S. PATENT DOCUMENTS

| | | | | |
|---|---|---|---|---|
| 4,453,066 A * | 6/1984 | Mori | A23L 3/365 | 219/703 |
| 4,471,354 A * | 9/1984 | Smith | A61B 5/0008 | 128/903 |
| 4,475,024 A * | 10/1984 | Tateda | G01K 1/024 | 219/713 |
| 4,518,839 A * | 5/1985 | Taguchi | H05B 6/6411 | 219/706 |
| 4,535,229 A * | 8/1985 | Wolf | A47J 27/0802 | 116/148 |
| 4,626,662 A * | 12/1986 | Woolf | F24C 7/08 | 219/442 |
| 4,710,611 A * | 12/1987 | Axelson | F24C 15/105 | 219/448.14 |
| 4,740,664 A * | 4/1988 | Payne | G05D 23/24 | 219/448.12 |
| 4,740,888 A * | 4/1988 | Ceste, Sr. | G05D 23/24 | 219/494 |
| 4,747,413 A * | 5/1988 | Bloch | A41B 13/00 | 128/903 |
| 4,785,824 A * | 11/1988 | Wickersheim | A61N 1/08 | 374/131 |
| 4,812,624 A * | 3/1989 | Kern | H01H 37/043 | 219/448.14 |
| 4,812,625 A * | 3/1989 | Ceste, Sr. | A47J 37/1266 | 219/442 |
| 4,812,963 A * | 3/1989 | Albrecht | A47J 27/62 | 219/492 |
| 4,817,510 A * | 4/1989 | Kowalics | A47J 27/62 | 126/374.1 |
| 4,817,582 A * | 4/1989 | Oslin | A21B 1/24 | 126/20 |
| 4,821,632 A * | 4/1989 | Bolzani | A23L 1/0121 | 426/509 |
| 4,851,644 A * | 7/1989 | Oslin | A47J 27/04 | 219/400 |
| 4,855,572 A * | 8/1989 | Wallgren | B23K 1/018 | 219/209 |
| 4,868,357 A * | 9/1989 | Serikawa | H05B 6/6464 | 219/706 |
| 4,884,626 A * | 12/1989 | Filipowski | F24C 7/087 | 165/231 |
| 4,913,038 A * | 4/1990 | Burkett | A47J 37/1266 | 99/329 R |
| 4,990,749 A * | 2/1991 | Devine | A47J 27/62 | 219/214 |
| 5,033,864 A * | 7/1991 | Lasecki | G01K 1/024 | 374/151 |
| 5,094,154 A * | 3/1992 | Nopanen | A47J 37/0835 | 219/492 |
| 5,176,451 A * | 1/1993 | Sasada | G01K 7/04 | 136/221 |
| 5,186,097 A * | 2/1993 | Vaseloff | G05D 23/1951 | 219/492 |
| 5,293,019 A * | 3/1994 | Lee | A23L 3/01 | 219/708 |
| 5,296,684 A * | 3/1994 | Essig | H05B 3/746 | 219/447.1 |
| 5,321,229 A * | 6/1994 | Holling | F24C 7/087 | 219/445.1 |
| 5,323,692 A * | 6/1994 | Grzywna | A47J 27/004 | 219/401 |
| 5,352,866 A * | 10/1994 | Cartwright | A47J 37/1266 | 219/442 |
| 5,361,683 A * | 11/1994 | Silvestrini | A23B 7/0053 | 99/330 |
| 5,374,435 A * | 12/1994 | Silvestrini | A23B 7/0053 | 426/231 |
| 5,466,603 A * | 11/1995 | Meehan | B01L 7/02 | 435/285.1 |
| 5,491,323 A * | 2/1996 | Mori | H05B 6/645 | 219/494 |
| 5,544,567 A * | 8/1996 | Davis | A47J 37/1266 | 99/336 |
| 5,555,994 A * | 9/1996 | Chen | A47J 36/06 | 126/369 |
| 5,558,793 A * | 9/1996 | McKee | A21B 1/245 | 126/21 R |
| 5,575,563 A * | 11/1996 | Chiu | G01K 1/14 | 374/141 |
| 5,582,755 A * | 12/1996 | Maher, Jr. | G05D 23/1919 | 219/492 |
| 5,596,514 A * | 1/1997 | Maher, Jr. | A47J 27/0802 | 700/300 |
| 5,620,624 A * | 4/1997 | Westerberg | A47J 27/62 | 219/411 |
| 5,682,149 A * | 10/1997 | Hofman | A61B 5/0008 | 340/870.17 |
| 5,726,423 A * | 3/1998 | Westerberg | A47J 27/62 | 219/411 |
| 5,796,346 A * | 8/1998 | Wash | H05B 3/68 | 219/445.1 |
| 5,809,994 A * | 9/1998 | Maher, Jr. | G05D 23/1913 | 126/374.1 |
| 5,827,556 A * | 10/1998 | Maher, Jr. | G05D 23/1951 | 219/490 |
| 5,883,362 A * | 3/1999 | Pettibone | F24C 7/06 | 219/411 |
| 5,893,051 A * | 4/1999 | Tomohiro | H05B 6/6452 | 219/710 |
| D409,440 S * | 5/1999 | King | H05B 6/6452 | D7/402 |
| D412,642 S * | 8/1999 | King | H05B 6/6452 | D7/402 |
| 5,938,961 A * | 8/1999 | Maher, Jr. | A47J 37/1266 | 219/442 |
| 5,949,960 A * | 9/1999 | Hall | F24H 9/2021 | 219/481 |
| 5,951,900 A * | 9/1999 | Smrke | A47J 27/62 | 219/431 |
| 5,958,271 A * | 9/1999 | Westerberg | H05B 3/0076 | 219/411 |
| 5,961,867 A * | 10/1999 | McWilliams | H05B 3/746 | 219/446.1 |
| 6,018,150 A * | 1/2000 | Maher, Jr. | G05D 23/1913 | 219/441 |
| 6,066,838 A * | 5/2000 | Koda | H05B 6/688 | 219/696 |
| D426,427 S * | 6/2000 | Rubbright | A47J 27/62 | D7/565 |
| 6,075,463 A * | 6/2000 | Wauer | G01K 11/265 | 219/518 |
| 6,080,972 A * | 6/2000 | May | A21B 1/02 | 219/486 |
| 6,130,412 A * | 10/2000 | Sizemore | F24C 7/08 | 219/414 |
| 6,132,782 A * | 10/2000 | Burkett | A47J 27/62 | 426/231 |
| 6,133,558 A * | 10/2000 | Ueda | H05B 6/645 | 219/682 |
| 6,155,160 A * | 12/2000 | Hochbrueckner | G05D 23/1917 | 126/112 |
| 6,175,105 B1 * | 1/2001 | Rubbright | A23L 1/16 | 219/725 |
| 6,217,918 B1 * | 4/2001 | Oh | A23L 1/16 | 426/241 |
| 6,244,165 B1 * | 6/2001 | Trombley | F25D 23/12 | 219/679 |
| 6,320,169 B1 * | 11/2001 | Clothier | G06K 7/0008 | 219/620 |
| 6,348,677 B2 * | 2/2002 | Aurre | F25D 23/12 | 219/448.11 |
| 6,378,315 B1 * | 4/2002 | Gelber | F25D 29/00 | 236/51 |
| 6,410,066 B1 * | 6/2002 | Weng | A23L 3/003 | 426/231 |

(56) References Cited

U.S. PATENT DOCUMENTS

| | | | | |
|---|---|---|---|---|
| 6,412,398 B1* | 7/2002 | Norcross | A23L 1/0158 | 294/55.5 |
| 6,416,711 B2* | 7/2002 | Weng | A23L 3/003 | 422/105 |
| 6,440,361 B2* | 8/2002 | Weng | A23L 3/027 | 422/105 |
| 6,472,008 B2* | 10/2002 | Weng | A23L 3/10 | 422/109 |
| 6,502,409 B1* | 1/2003 | Gatling | F25D 29/00 | 236/51 |
| RE37,988 E* | 2/2003 | Uss | A47J 27/212 | 16/110.1 |
| 6,518,550 B1* | 2/2003 | Weng | G05D 23/1917 | 219/413 |
| 6,568,848 B1* | 5/2003 | Chapman | G01K 1/024 | 340/870.17 |
| 6,577,969 B2* | 6/2003 | Takeda | G06Q 10/06 | 702/81 |
| 6,583,392 B2* | 6/2003 | Hershey | H05B 3/746 | 219/413 |
| 6,663,009 B1* | 12/2003 | Bedetti | F24C 3/126 | 126/374.1 |
| 6,698,923 B2* | 3/2004 | Bedetti | A47J 43/28 | 374/149 |
| 6,712,505 B2* | 3/2004 | Chapman | G01K 1/024 | 340/870.17 |
| 6,779,918 B2* | 8/2004 | Gatling | F25D 29/00 | 236/51 |
| 6,811,308 B2* | 11/2004 | Chapman | G01K 1/024 | 340/870.17 |
| 6,812,437 B2* | 11/2004 | Levy | H05K 7/20209 | 219/483 |
| 6,817,757 B1* | 11/2004 | Wallace | F24C 7/08 | 340/870.17 |
| 6,818,865 B2* | 11/2004 | Mangina | F24C 7/087 | 219/413 |
| 6,854,883 B2* | 2/2005 | Rund | G01K 15/00 | 116/216 |
| 6,856,247 B1* | 2/2005 | Wallace | G01K 1/026 | 340/539.16 |
| 6,856,932 B1* | 2/2005 | Wallace | G01K 1/026 | 374/E1.005 |
| 6,862,494 B2* | 3/2005 | Hu | A47J 27/62 | 219/702 |
| 6,953,919 B2* | 10/2005 | Clothier | H05B 6/062 | 219/494 |
| 6,963,058 B2* | 11/2005 | Head | H05B 6/6458 | 219/682 |
| 6,976,368 B1* | 12/2005 | Lamstaes | F25D 29/00 | 236/15 BB |
| 6,987,250 B2* | 1/2006 | Levy | F24F 6/00 | 219/483 |
| 7,005,986 B2* | 2/2006 | Parks, III | G08B 21/20 | 128/903 |
| 7,009,160 B2* | 3/2006 | Han | H05B 6/6408 | 219/763 |
| 7,013,661 B2* | 3/2006 | Gatling | F25D 29/00 | 236/51 |
| 7,019,638 B1* | 3/2006 | Wallace | G01K 1/024 | 340/531 |
| 7,026,929 B1* | 4/2006 | Wallace | G08B 25/009 | 340/539.13 |
| 7,057,142 B1* | 6/2006 | Lubrina | F24C 7/082 | 219/494 |
| 7,080,593 B1* | 7/2006 | Frankel | A47J 37/041 | 219/494 |
| 7,109,444 B2* | 9/2006 | Levy | F24F 6/00 | 219/483 |
| 7,150,156 B2* | 12/2006 | Gatling | F25D 29/00 | 236/51 |
| 7,157,675 B2* | 1/2007 | Imura | A47J 27/62 | 219/627 |
| 7,174,720 B2* | 2/2007 | Kennedy | A47J 27/004 | 62/3.3 |
| 7,293,665 B1* | 11/2007 | Hardy | F24C 15/16 | 211/133.5 |
| 7,307,246 B2* | 12/2007 | Smolenski | G01K 1/14 | 219/446.1 |
| 7,312,425 B2* | 12/2007 | DeCobert | A47J 27/62 | 219/432 |
| 7,322,278 B2* | 1/2008 | Mercer | A47J 37/1266 | 99/331 |
| 7,358,464 B2* | 4/2008 | Beier | G01D 5/48 | 219/392 |
| 7,363,502 B1* | 4/2008 | Mercer | A47J 37/1266 | 713/184 |
| D568,676 S* | 5/2008 | Steiner | A47J 27/004 | D7/354 |
| 7,401,472 B2* | 7/2008 | Manole | F25B 1/005 | 165/104.33 |
| 7,426,885 B2* | 9/2008 | McLemore | A23B 4/052 | 126/59.5 |
| 7,520,670 B2* | 4/2009 | Schwegman | F26B 5/06 | 215/200 |
| D595,316 S* | 6/2009 | Farah | A47J 27/004 | D15/81 |
| 7,573,005 B2* | 8/2009 | Clothier | H05B 3/746 | 219/412 |
| 7,605,349 B2* | 10/2009 | Gaynor | A47J 27/004 | 165/47 |
| 7,703,389 B2* | 4/2010 | McLemore | A47J 37/1209 | 340/501 |
| 7,706,671 B2* | 4/2010 | Brown | A47J 27/62 | 219/238 |
| 7,722,248 B1* | 5/2010 | Chapman | G01K 1/024 | 340/870.17 |
| 7,820,947 B2* | 10/2010 | Gaynor | A47J 27/004 | 165/47 |
| 7,875,836 B2* | 1/2011 | Imura | A47J 27/62 | 219/620 |
| 7,935,914 B2* | 5/2011 | Imura | A47J 27/0802 | 219/627 |
| RE42,513 E* | 7/2011 | Clothier | A47J 27/004 | 219/494 |
| D641,202 S* | 7/2011 | Bock | A47J 27/004 | D7/354 |
| 8,001,957 B2* | 8/2011 | Clauss | F23N 1/005 | 126/39 E |
| 8,003,923 B2* | 8/2011 | Wilsdorf | A47L 15/4257 | 219/445.1 |
| 8,058,590 B2* | 11/2011 | Thorneywork | A23L 1/01 | 219/473 |
| 8,084,722 B2* | 12/2011 | Haas | A41D 13/0051 | 219/211 |
| 8,104,629 B1* | 1/2012 | Plumer | A47G 23/0208 | 211/74 |
| 8,151,697 B2* | 4/2012 | Valentine | A47J 37/042 | 99/421 H |
| 8,191,465 B2* | 6/2012 | Sager | H05B 6/6441 | 219/682 |
| 8,212,189 B2* | 7/2012 | Imura | F24C 7/082 | 219/412 |
| 8,212,193 B2* | 7/2012 | Ferron | A47J 27/002 | 219/438 |
| 8,235,697 B2* | 8/2012 | Olin | B29C 45/2642 | 425/174.8 E |
| 8,240,914 B1* | 8/2012 | Chapman | G01K 1/024 | 340/870.17 |
| 8,309,894 B2* | 11/2012 | Zimmer | F24H 3/0411 | 219/552 |
| 8,323,026 B2* | 12/2012 | Do | G09B 21/003 | 219/385 |
| 8,333,369 B2* | 12/2012 | Kozlik | B29C 63/42 | 124/86 |
| 8,342,847 B2* | 1/2013 | Do | G09B 21/00 | 219/385 |
| 8,375,848 B2* | 2/2013 | Valentine | A47J 37/042 | 99/421 H |

(56) References Cited

U.S. PATENT DOCUMENTS

| | | | | |
|---|---|---|---|---|
| 8,389,913 B2* | 3/2013 | Wilson | H05B 6/108 | 219/621 |
| 8,398,303 B2* | 3/2013 | Kuhn | G01K 1/024 | 219/712 |
| 8,419,433 B2* | 4/2013 | Do | G06F 17/30867 | 219/385 |
| 8,419,434 B2* | 4/2013 | Do | G09B 21/003 | 219/385 |
| 8,592,728 B2* | 11/2013 | Ahlander | A47J 27/022 | 219/429 |
| 8,598,497 B2* | 12/2013 | Broders | G05D 23/1902 | 219/412 |
| 8,618,448 B2* | 12/2013 | Alexander | A47G 19/2288 | 165/58 |
| 8,621,987 B2* | 1/2014 | Herbst | A47J 36/165 | 366/241 |
| 8,637,797 B2* | 1/2014 | Imura | A47J 27/62 | 219/620 |
| 8,676,245 B2* | 3/2014 | Maracas | H04W 52/246 | 340/577 |
| 8,701,752 B2* | 4/2014 | Godecker | A47J 39/02 | 165/253 |
| 8,752,538 B2* | 6/2014 | Valentine | A47J 37/042 | 126/1 R |
| 8,754,351 B2* | 6/2014 | England | H05B 6/062 | 219/620 |
| 8,759,721 B1* | 6/2014 | Alexander | A47G 19/2288 | 165/58 |
| 8,766,144 B2* | 7/2014 | McLoughlin | F24C 7/08 | 219/391 |
| 8,976,158 B2* | 3/2015 | Eriksson | G06F 1/169 | 345/175 |
| 8,992,225 B2* | 3/2015 | Do | G09B 21/00 | 219/385 |
| 9,006,622 B2* | 4/2015 | Beverly | H05B 6/062 | 219/624 |
| 9,035,222 B2* | 5/2015 | Alexander | F24C 7/08 | 165/58 |
| 9,057,526 B2* | 6/2015 | Barritt | F24C 7/082 | |
| 9,060,212 B2* | 6/2015 | Loic | H04Q 9/00 | |
| 9,119,501 B2* | 9/2015 | Xie | A47J 36/32 | |
| 9,131,537 B2* | 9/2015 | Broders | F24F 1/022 | |
| 9,132,302 B2* | 9/2015 | Luongo | A62C 3/006 | |
| 9,157,640 B2* | 10/2015 | Distaso | F24C 15/2007 | |
| 9,175,870 B2* | 11/2015 | Kakiuchi | F24F 11/006 | |
| 9,182,134 B2* | 11/2015 | Ariga | F24F 1/022 | |
| 9,220,365 B1* | 12/2015 | Okonkwo | A47J 36/34 | |
| 9,226,343 B2* | 12/2015 | Moon | H05B 6/062 | |
| 9,226,609 B2* | 1/2016 | Romero | A47J 27/18 | |
| 9,237,829 B2* | 1/2016 | Alet Vidal | B01F 13/0033 | |
| 9,271,339 B2* | 2/2016 | Hirano | H05B 6/666 | |
| 9,328,937 B2* | 5/2016 | Tomlinson | F24F 11/053 | |
| 9,341,518 B2* | 5/2016 | Batti | G01K 1/14 | |
| 2002/0175213 A1* | 11/2002 | Wodeslaysky | F24C 3/126 | 236/20 A |
| 2003/0070799 A1* | 4/2003 | Mueller | A47J 39/006 | 165/254 |
| 2004/0016348 A1* | 1/2004 | Sharpe | A47J 37/10 | 99/331 |
| 2004/0149736 A1* | 8/2004 | Clothier | H05B 6/062 | 219/627 |
| 2004/0164067 A1* | 8/2004 | Badami | H05B 3/746 | 219/494 |
| 2005/0089809 A9* | 4/2005 | Repper | F23N 1/005 | 431/66 |
| 2006/0086258 A1* | 4/2006 | Sharpe | A47J 37/10 | 99/331 |
| 2006/0118547 A1* | 6/2006 | Alfredeen | H05B 6/065 | 219/624 |
| 2007/0170169 A1* | 7/2007 | Jeong | F24C 15/105 | 219/448.12 |
| 2008/0185376 A1* | 8/2008 | Gagas | H05B 6/1263 | 219/623 |
| 2008/0295702 A1* | 12/2008 | Wiedemann | H05B 6/6435 | 99/325 |
| 2010/0000980 A1* | 1/2010 | Popescu | A47J 36/20 | 219/201 |
| 2010/0006558 A1* | 1/2010 | McLoughlin | F24C 7/08 | 219/392 |
| 2010/0196561 A1* | 8/2010 | Kling | F24C 7/08 | 426/233 |
| 2011/0175737 A1* | 7/2011 | Pforte | G05D 23/1931 | 340/584 |
| 2013/0112683 A1* | 5/2013 | Hegedis | A47J 27/62 | 219/660 |
| 2013/0220143 A1* | 8/2013 | Fetterman | A47J 36/2405 | 99/330 |
| 2013/0305933 A1* | 11/2013 | Heidrich | A47J 27/62 | 99/331 |
| 2014/0033928 A1* | 2/2014 | Broders | G05D 23/1902 | 99/331 |
| 2014/0048293 A1* | 2/2014 | Luongo | A62C 3/006 | 169/65 |
| 2014/0184496 A1* | 7/2014 | Gribetz | G02B 27/017 | 345/156 |
| 2014/0210793 A1* | 7/2014 | Eriksson | G06F 1/169 | 345/175 |
| 2014/0234496 A1* | 8/2014 | Siegel | A47J 27/62 | 426/231 |
| 2015/0082995 A1* | 3/2015 | Broders | G05D 23/1902 | 99/331 |
| 2015/0099245 A1* | 4/2015 | Bouchard | A61B 5/6887 | 434/127 |
| 2015/0153050 A1* | 6/2015 | Eriksson | G06F 1/169 | 219/445.1 |
| 2016/0076775 A1* | 3/2016 | Luongo | A62C 3/006 | 126/39 G |

FOREIGN PATENT DOCUMENTS

WO 2013134785 A2 9/2013
WO 2014037451 A2 3/2014

* cited by examiner

METHOD OF REGULATING TEMPERATURE FOR SOUS VIDE COOKING AND APPARATUS THEREFOR

BACKGROUND

The present disclosure relates to a method of regulating temperature for sous vide cooking and a cooking vessel and cooktop therefor.

SUMMARY

One aspect of the present disclosure includes a cooking vessel for sous vide cooking on a burner of a cooktop. The cooking vessel has a bottom surface and at least one wall extending generally orthogonally from the bottom surface. The at least one wall has a height h and an interior surface, and the interior surface and the bottom surface define an interior space in the cooking vessel. A first temperature sensor is affixed to the interior surface of the at least one wall, within a top 20% to 30% of the height h of the at least one wall.

In another aspect, the present disclosure includes a system for sous vide cooking. The system includes a cooktop having at least one burner, a controller to control a power supply for the burner, and a user interface which permits a user to enter a predetermined cooking temperature and a predetermined cooking time. The system also includes a sous vide cooking vessel having a bottom surface, at least one wall extending generally orthogonally from the bottom surface having a height h and an interior surface, and a first temperature sensor affixed to the interior surface of the at least one wall. The first temperature sensor includes a sensor to detect a temperature of a cooking liquid and a transmitter to transmit the temperature of the cooking liquid to a receiver in the controller. The controller adjusts the energy output of the burner based on the temperature of the cooking liquid, the predetermined cooking temperature, and the predetermined cooking time.

Yet another aspect of the present disclosure includes a method of regulating a temperature of a cooking liquid during sous vide cooking in a sous vide cooking vessel on a burner of a cooktop. The method includes setting a desired cooking temperature and measuring the temperature of the cooking liquid inside the sous vide cooking vessel at a plurality of predetermined time intervals with a first temperature sensor mounted on an interior surface of a wall of the sous vide cooking vessel. The temperature of the cooking liquid is compared to the desired cooking temperature at each of the predetermined time intervals. The energy output of the burner is controlled based on the difference between the temperature of the cooking liquid and the desired cooking temperature.

The method of regulating the temperature of the cooking liquid during sous vide cooking in a cooking vessel on a burner of a cooktop, and the cooking vessel and the system for sous vide cooking disclosed herein allow sous vide cooking on a cooktop, rather than in a dedicated appliance, and maintain the temperature of the cooking liquid at a low, controlled cooking temperature for slow and even cooking. The measurement of the temperature of the cooking liquid directly also allows for more precise control than measuring the temperature of the cooking vessel itself. Additionally, the method of regulating the temperature described herein allows for a pre-programmed cooking program that uses varying cooking temperatures over the course of the cooking time.

These and other features, advantages, and objects of the present device will be further understood and appreciated by those skilled in the art upon studying the following specification, claims, and appended drawings.

DETAILED DESCRIPTION

Figure 1:
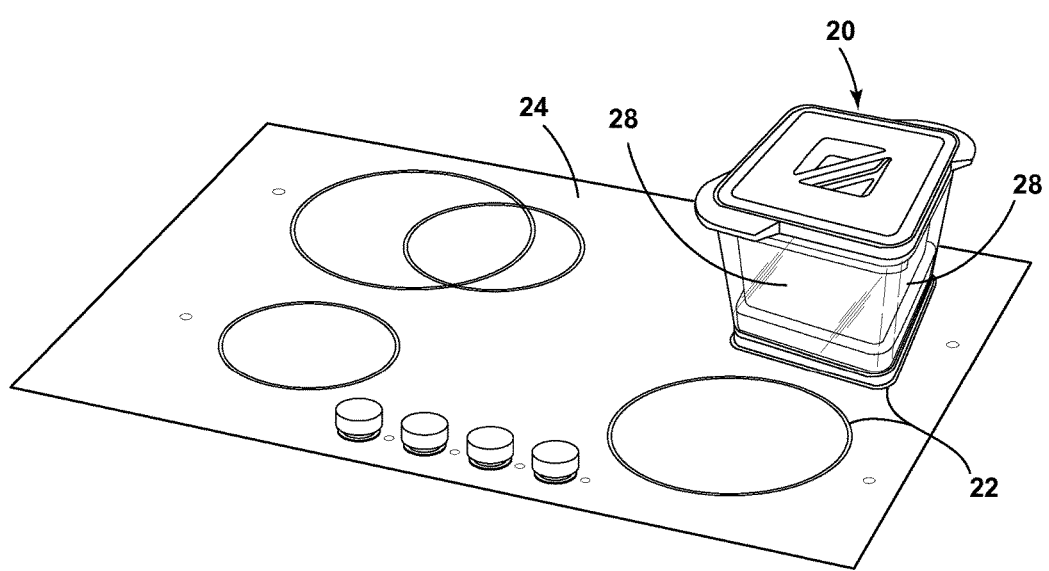
FIG. 1 is a top perspective view of one embodiment of a sous vide cooking vessel with a lid, positioned on a cooktop.
Figure 2:
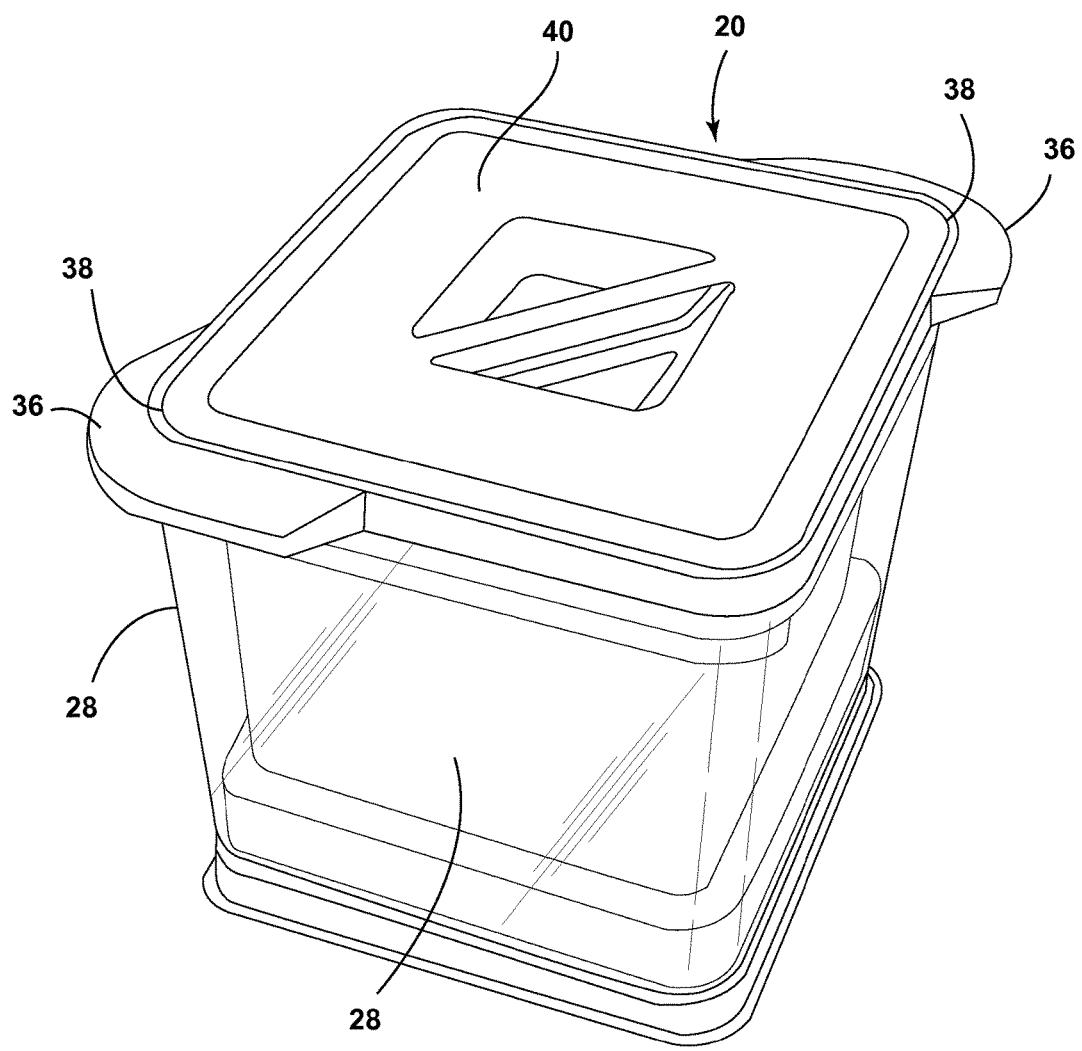
FIG. 2 is a top perspective view of the embodiment of the sous vide cooking vessel and the lid of FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
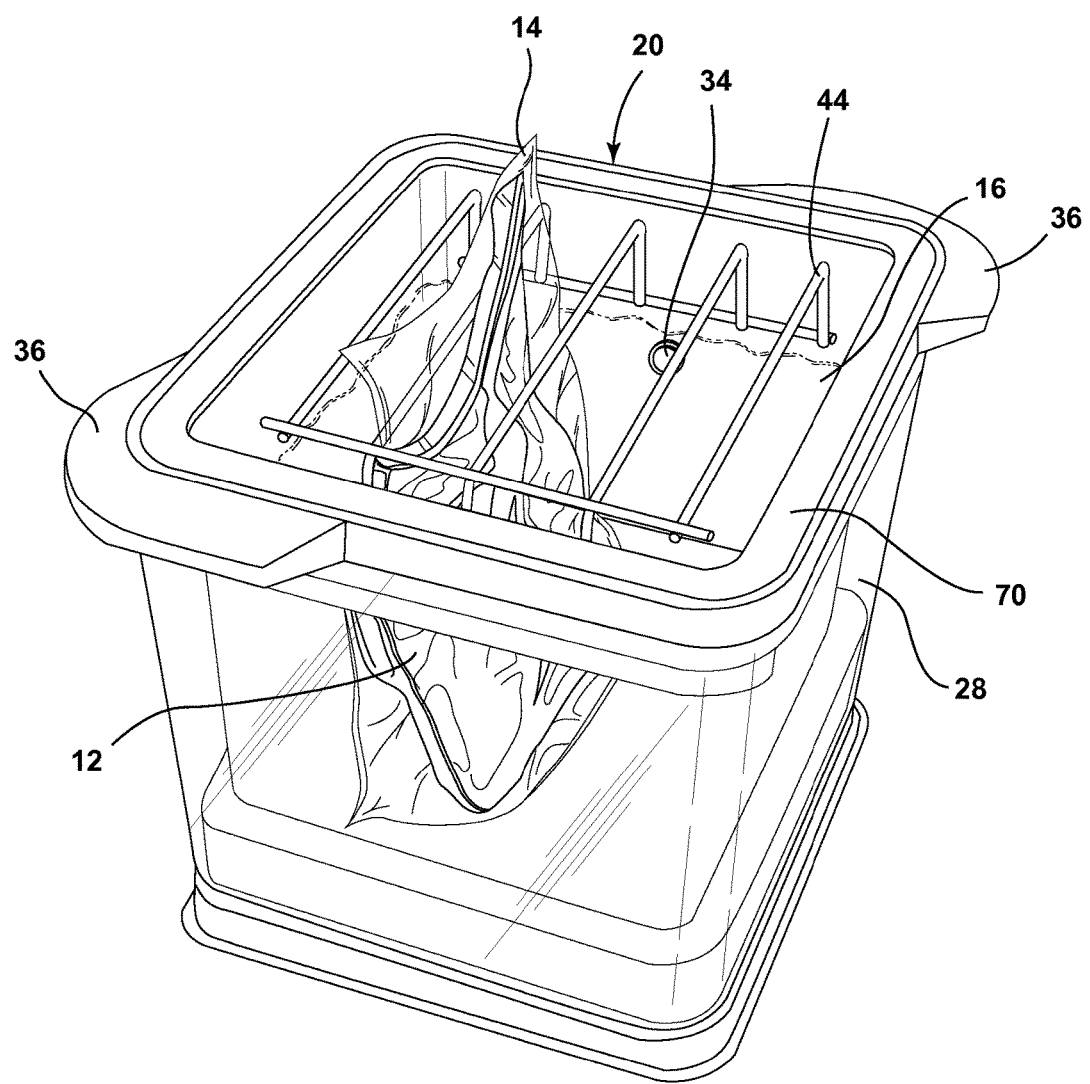
FIG. 4 is a top perspective view of the embodiment of the sous vide cooking vessel of FIG. 1, with the lid removed and a separation rack installed.

In general, sous vide cooking involves the cooking of food items 12 by enclosing the food items 12 in a package 14 and submersing the package 14 in a cooking liquid 16 for a period of time as shown in FIG. 4. The cooking liquid 16 is generally maintained at a temperature that is low compared to traditional cooking, i.e., below the boiling temperature of water, which allows for slow, gentle cooking of the food items 12. Cooking times for sous vide cooking vary greatly, from less than an hour to several days, depending on the type of food item 12, the size of the food item 12, and the temperature of the cooking liquid 16.

One embodiment of a cooking vessel 20 for sous vide cooking is generally depicted as numeral 20 in FIGS. 1-4. The cooking vessel 20 is adapted for sous vide cooking on a burner 22 of a cooktop, and includes a bottom surface 26 and at least one side wall 28 extending generally orthogonally from the bottom surface 26. The at least one side wall 28 has a height h and an interior surface 30. The interior surface 30 of the at least one wall 28 and the bottom surface 26 define an interior space 32 in the cooking vessel 20. A first temperature sensor 34 is affixed to the interior surface 30 of the at least one side wall 28. In the embodiment depicted in FIGS. 1-4, the first temperature sensor 34 is affixed to the interior surface 30 of the at least one side wall 28 within a top 20% to 30% of the height h of the at least one side wall 28.

As shown in the embodiment of the cooking vessel 20 depicted in FIGS. 1-4, a preferred cooking vessel 20 configuration includes a generally square shape, with handles 36 provided on opposing corners 38 of the cooking vessel 20 and a lid 40 to cover the cooking vessel 20, which aids in maintaining the cooking liquid 16 at a desired cooking temperature. The sous vide cooking vessel 20 can be made from any materials known for the construction of cooking vessels or sous vide cooking vessels, preferably including materials that aid in maintaining the desired cooking temperature for long periods of time. In one preferred construction, the sous vide cooking vessel 20 includes a ceramic or stoneware base member defining the bottom surface 26, and a double layer of glass with an insulating layer therebetween for the side walls 28. Alternative materials for the cooking vessel 20 can include, without limitation, ceramics, stoneware, stainless steel, aluminum, copper, or any other materials used for cooking vessels 20, with or without nonstick coatings.

The first temperature sensor 34 is affixed to the interior surface 30 of the at least one side wall 28, where it is positioned to measure the temperature of the cooking liquid 16 through contact with the liquid. Detecting the temperature of the cooking liquid 16, rather than the temperature of the cooking vessel 20 itself, allows for a precise control of the cooking temperature, and allows the use of double walled or insulated cooking vessels 20 to maintain the cooking temperature.

Figure 3:
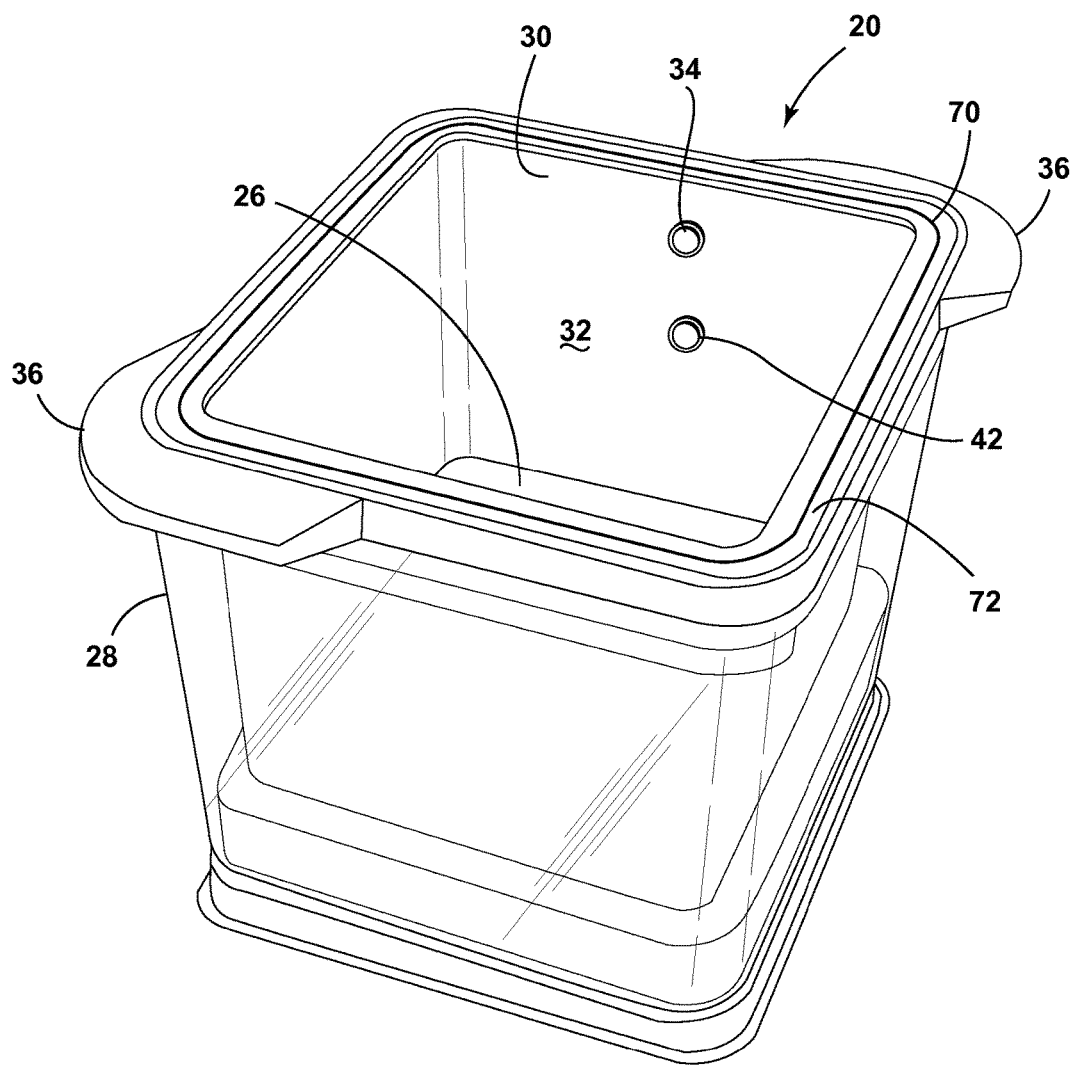
FIG. 3 is a top perspective view of the embodiment of the sous vide cooking vessel of FIG. 1, with the lid removed.

A second temperature sensor 42 is optionally affixed to the interior surface 30 of the at least one wall 28, as shown in FIG. 3. In one embodiment, the second temperature sensor 42 operates as a backup sensor to detect the temperature of the cooking liquid 16. In another embodiment, the second temperature sensor 42 is located at a lower height than the first temperature sensor 34, and the difference in height allows the sensors to be used to detect when the level of the cooking liquid 16 has fallen below the height of the first temperature sensor 34. When the level of the cooking liquid 16 falls below the height of the first temperature sensor 34, but is still above the height of the second temperature sensor 42, the temperature readings from the first temperature sensor 34 will diverge from the temperature readings from the second temperature sensor 42 due to the change in temperature of air as compared to the temperature of the cooking liquid 16.

A rack 44 is optionally provided for the cooking vessel 20, to fit within the interior space 32 of the cooking vessel 20 and to support the packages 14, so that the packages 14 are spaced to allow the cooking liquid 16 to circulate therebetween.

In one embodiment, the temperature sensors 34, 42 are affixed to the at least one interior surface 30 using an epoxy-based adhesive. In other embodiments, the temperature sensors 34, 42 can be affixed to a bracket, or include engaging features to interact with the interior surface 30 and secure the temperature sensors 34, 42 thereto. In various embodiments, the first or second temperature sensors 34, 42 are removable. Removable temperature sensors 34, 42 facilitate cleaning of the cooking vessel 20, use of the vessel for storage of the food items 12, or other uses of the cooking vessel 20.

Figure 5:
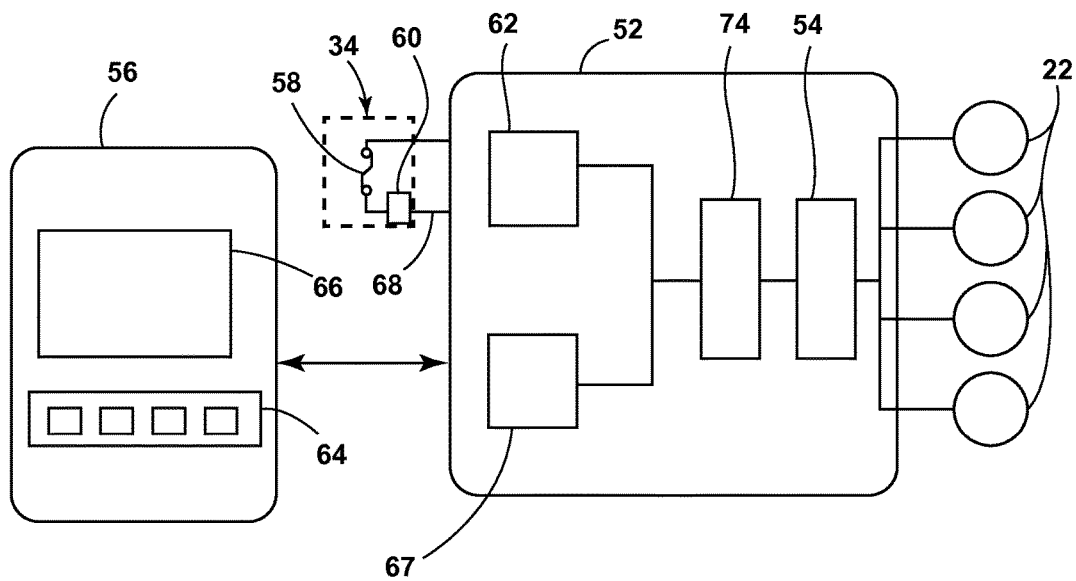
FIG. 5 is a schematic representation of one embodiment of a system for regulating temperature for sous vide cooking in a sous vide cooking vessel on a cooktop burner.
Figure 6:
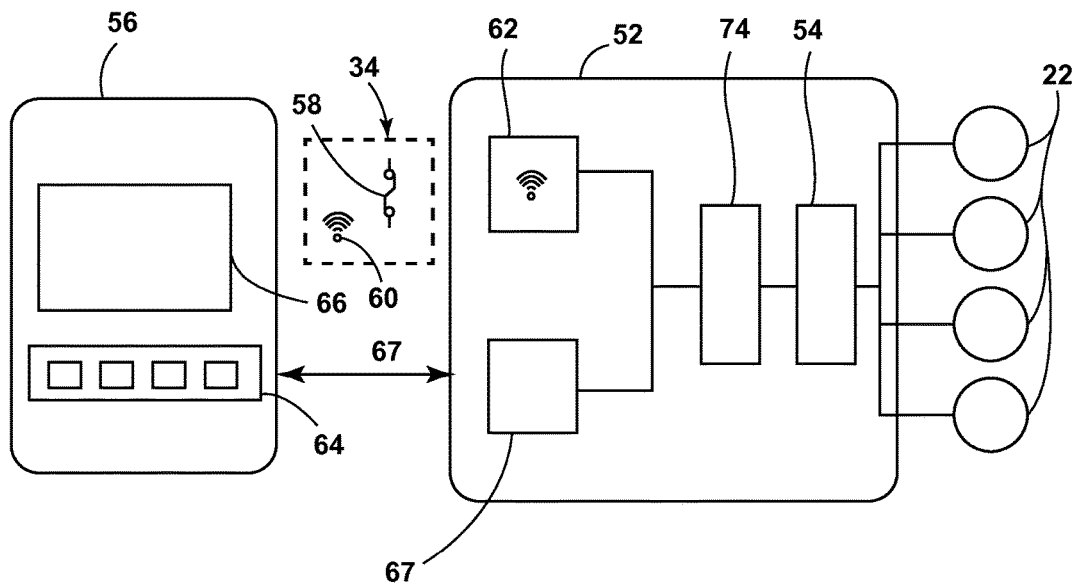
FIG. 6 is a schematic representation of another embodiment of a system for regulating temperature for sous vide cooking in a sous vide cooking vessel on a cooktop burner.

The cooking vessel 20 of FIGS. 1-4 is used in connection with the cooktop 24 to form a system for sous vide cooking 50. FIGS. 5 and 6 depict schematic representations of two embodiments of the system for sous vide cooking 50. As shown in the embodiments depicted in FIGS. 5 and 6, various embodiments of the system for sous vide cooking 50 include a cooktop having at least one burner 22, a controller 52 to control a power supply 54 to the burner 22 and thereby control the energy output of the burner 22, and a user interface 56 which permits a user to enter a predetermined cooking temperature and a predetermined cooking time. The cooktop is used with the cooking vessel 20 as shown in FIGS. 1-4, wherein the cooking vessel 20 includes the bottom surface 26 and the at least one wall 28 extending generally orthogonally from the bottom surface 26 having the height h and the interior surface 30. The cooking vessel 20 for use in these embodiments of sous vide cooking systems also include the first temperature sensor 34 affixed to the interior surface 30 of the at least one wall 28. The first temperature sensor 34 includes a sensor 58 to detect the temperature of the cooking liquid 16 and a transmitter 60 to transmit the temperature of the cooking liquid 16 to a receiver in the controller 52. The controller 52 adjusts the power supply 54 to the burner 22 based on the temperature of the cooking liquid 16, the predetermined cooking temperature and the predetermined cooking time.

In both embodiments depicted in FIGS. 5 and 6, the system includes the cooktop 24 and the sous vide cooking vessel 20. The cooktop 24 includes the user interface 56, generally having a user input device 64 and a display 66. The user input device 64 can be a keyboard, a touch screen, a series of buttons, a slider bar, a scrolling device, or any other known user input devices 64. The display 66 preferably includes a screen to show the user what options have been selected or input with the user input device 64. The user interface 56 is in communication with the controller 52 of the cooktop 24, to transmit user input 67 to the controller 52, and to receive information from the controller 52 to display to the user. The controller 52 is also in communication with the first temperature sensor 34 (and optionally the second temperature sensor 42) inside the cooking vessel 20, with the controller 52 receiving information from the first temperature sensor 34 (and optionally the second temperature sensor 42) including the temperature of the cooking liquid 16. In the embodiment depicted in FIG. 5, the first temperature sensor 34 communicates with the controller 52 via a wired connection 68 between the transmitter 60 of the temperature sensor 58 and a receiver 62 of the controller 52. In the embodiment depicted in FIG. 6, the transmitter 60 of the first temperature sensor 34 communicates wirelessly with the receiver 62 in the controller 52, using any known wireless communication protocol. As shown in FIG. 3, where a wired connection is used, the cooking vessel 20 preferably includes a groove 70 about at least a portion of a top edge 72 of the at least one wall 28 to accommodate passage of the conductive wire between the top edge of the at least one wall 28 and the lid 40 of the cooking vessel 20 while still allowing the lid 40 to tightly close the cooking vessel 20.

The controller 52 uses an algorithm 74 to compare the temperature of the cooking liquid received from the first temperature sensor 34 to the desired cooking temperature input using the user interface 56, and adjusts the power supply 54 to the cooktop burners 22 based on the comparison of the desired cooking temperature and the temperature reading to adjust the energy output of the burners 22. Additionally, the controller 52 tracks the predetermined cooking time, and reduces or eliminates the power supply 54 to the burner 22 when the predetermined cooking time has been reached. In alternate embodiments, the controller 52 can cause the display 66 of the user interface 56 to alert the user that the predetermined cooking time has been reached using an audible signal or by showing this information on the display 66.

Figure 7:
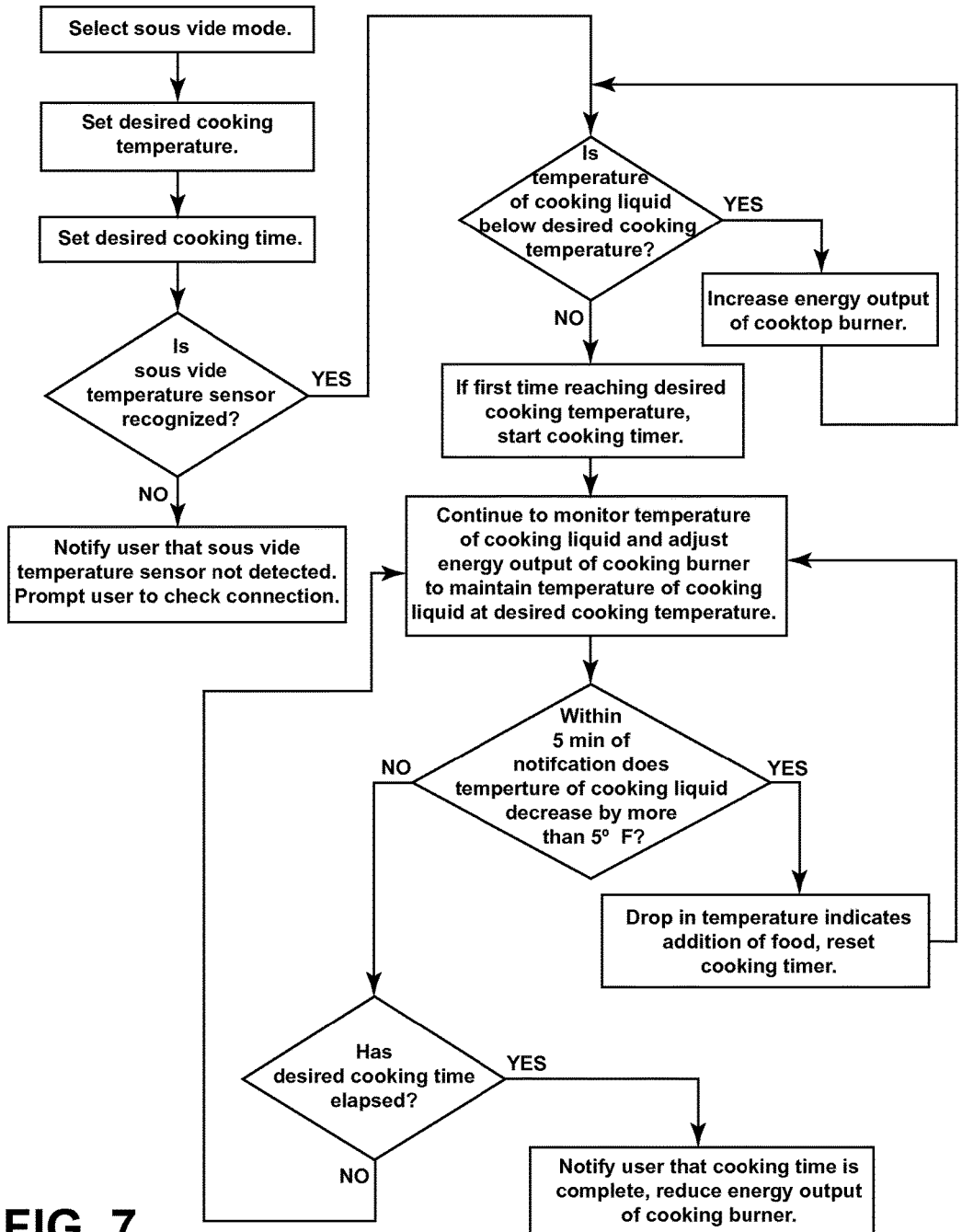
FIG. 7 is a flow diagram illustrating one embodiment of a method of regulating temperature for sous vide cooking in a sous vide cooking vessel on a cooktop burner.

As depicted in the embodiment shown in FIG. 7, the temperature of the cooking liquid 16 is regulated during sous vide cooking in a cooking vessel 20 as described herein by setting the desired cooking temperature, and measuring the temperature of the cooking liquid 16 inside the cooking vessel 20 at a plurality of predetermined time intervals with the first temperature sensor 34 which is mounted on an interior surface 30 of the wall of the cooking vessel 20. The temperature of the cooking liquid 16 is compared to the desired cooking temperature at each of the predetermined time intervals, and the energy output of the burner 22 is controlled based on the difference between the desired cooking temperature and the temperature of the cooking liquid 16. For example, in one embodiment, the energy output of the burner 22 is increased when the temperature of the cooking liquid 16 is below the desired cooking temperature, or when it falls below of a desired range of cooking temperatures. In another embodiment, the energy output of the burner 22 can also be decreased when the temperature of the cooking liquid 16 is above the desired cooking temperature, or when it is above the desired range of cooking temperatures. In some embodiments, the energy output of the burner 22 is controlled by a controller 52 in the cooktop 24 directing the adjustment of the power supply 54 to the burner 22 if needed at each of the predetermined time intervals. In alternate embodiments, the temperature of the cooking liquid 16 is displayed on the display 66 and the power supply 54 to the burner 22 and its energy output is controlled by the user monitoring the display 66.

In another embodiment, as shown in the flow chart depicted in FIG. 7, the user selects a sous vide cooking mode using the user input 67 of the cooktop 24, and then sets the desired cooking temperature and the desired cooking time using the user interface 56. The user interface 56 transmits this information to the controller 52, which then determines whether the first temperature sensor 34 is recognized. If the first temperature sensor 34 is not recognized, the user is notified that a first temperature sensor 34 is not detected, and prompted to check the connection (wireless or wired, as applicable) between the first temperature sensor 34 in the cooking vessel 20 and the cooktop 24. If the first temperature sensor 34 is detected, the controller 52 compares the value of the measurement of the temperature of the cooking liquid 16 supplied by the first controller 52 to the desired cooking temperature. If the temperature measurement transmitted to the controller 52 by the first temperature sensor 34 is less than the desired cooking temperature, the controller 52 directs an increase in the energy output of the cooktop burner 22. The first temperature sensor 34 continues to take measurements of the temperature of the cooking liquid 16 at a plurality of predetermined time intervals, and transmits the measurements to the controller 52. The controller 52 continues to compare the measurements from the first temperature sensor 34 to the desired cooking temperature until the temperature of the cooking liquid 16 reaches the desired cooking temperature. Optionally, as shown in FIG. 7, when the temperature of the cooking liquid 16 reaches the desired cooking temperature, the user is notified that the desired cooking temperature has been reached and signaled to insert food and a cooking timer is started to determine when the desired cooking time has been reached.

Also as shown in FIG. 7, once the desired cooking temperature has been reached the first temperature sensor 34 continues to take measurements of the temperature of the cooking liquid 16 at predetermined intervals and transmit the temperature of the cooking liquid 16 to the controller 52. The controller 52 continues to compare each of the measurements to the desired cooking temperature at each of the predetermined intervals. If the temperature of the cooking liquid 16 decreases by more than a predetermined amount (e.g., 5° F.) within a predetermined time period, (e.g., 5 minutes), after notification of the cooking liquid 16 reaching the desired cooking temperature, the controller 52 recognizes this as signaling the introduction of food to the cooking vessel 20, and restarts the cooking timer. The cooking timer could be restarted at the time of the temperature drop or upon the reaching the cooking temperature again after the temperature drop, as desired. Once the desired cooking temperature has been reached, and optionally after the detection of the introduction of food to the cooking vessel 20, the first temperature sensor 34 continues to measure the temperature of the cooking liquid 16 at predetermined intervals, and the controller 52 continues to compare the temperature of the cooking liquid 16 to the predetermined desired cooking temperature and adjusts the energy output of the cooktop burner 22 to maintain the temperature of the cooking liquid 16 at the desired cooking temperature throughout the cooking time. When the desired cooking time has elapsed, the user is notified that the cooking time has been completed, and the energy output of the cooktop burner 22 is either eliminated or reduced to a minimal level to stop or slow the cooking of the food items 12.

The method of regulating the temperature of the cooking liquid 16 during sous vide cooking described herein also allows the use of predetermined cooking programs that make use of a varying desired cooking temperature over the course of the predetermined cooking time. For example, the sous vide cooking could be carried out using a first desired cooking temperature for a first portion of the cooking time and using the controller 52 to adjust the burner 22 energy output to obtain the first desired cooking temperature, and then changing to a second desired cooking temperature for a second portion of the cooking time and using the controller 52 to adjust the burner 22 energy output to obtain the second desired cooking temperature.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A system for sous vide cooking, comprising:
    a cooktop, comprising:
        at least one burner,
        a controller to control a power supply for the burner, and
        a user interface which permits a user to enter a predetermined cooking temperature and a predetermined cooking time; and
    a sous vide cooking vessel, comprising:
        a bottom surface,
        at least one wall extending generally orthogonally from the bottom surface, the at least one wall including inner and outer upright walls that are spaced-apart from one another to define an insulating space therebetween, wherein the inner wall including an interior surface, and further wherein the inner wall of the at least one wall and the bottom surface cooperate to define an interior space within the cooking vessel for receiving a cooking liquid; and
        a first temperature sensor affixed to the interior surface of the inner wall and having an exposed portion that is exposed to the interior space of the cooking vessel, wherein the first temperature sensor includes a sensor in contact with the cooking liquid to detect a temperature of the cooking liquid and a transmitter to transmit the temperature of the cooking liquid to a receiver in the controller, wherein the controller adjusts the power supply to the burner based on the temperature of the cooking liquid, the predetermined cooking temperature, and the predetermined cooking time.

2. The system for sous vide cooking of claim 1, wherein the transmitter and receiver are operatively connected via a wireless communication method.

3. The system for sous vide cooking of claim 1, wherein the transmitter and receiver are operatively connected with a conductive wire.

4. The system for sous vide cooking of claim 1, wherein the first temperature sensor is affixed to the interior surface of the inner wall, within a top 20% to 30% of a height of the inner wall.

5. The system for sous vide cooking of claim 4, wherein the first temperature sensor is removably mounted to the interior surface of the inner wall.

6. The system for sous vide cooking of claim 1, wherein the first temperature sensor includes a wireless transmitter to transmit the temperature of a cooking liquid to a controller for the burner.

7. The system for sous vide cooking of claim 1, wherein the first temperature sensor includes a wired output to transmit the temperature of a cooking liquid to a controller for the burner.

8. The system for sous vide cooking of claim 7, wherein the cooking vessel includes a lid and a groove about at least a portion of a top edge of the at least one wall to accommodate passage of a conductive wire between the top edge of the at least one wall and the lid.

9. The system for sous vide cooking of claim 1, further comprising:
    a second temperature sensor affixed to the interior surface of the inner wall, wherein the second temperature sensor is located at a height below the first temperature sensor.

10. The system for sous vide cooking of claim 1, wherein the first temperature sensor is adhered to the interior surface of the inner wall using an epoxy-based adhesive.

* * * * *